United States Patent
Mohaisen et al.

(10) Patent No.: US 8,112,386 B2
(45) Date of Patent: Feb. 7, 2012

(54) ROTATION BASED TRANSFORMATION METHOD AND APPARATUS FOR PRESERVING DATA PRIVACY

(75) Inventors: Abedelaziz Mohaisen, Daejeon (KR); Dowon Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 303 days.

(21) Appl. No.: 12/575,193

(22) Filed: Oct. 7, 2009

(65) Prior Publication Data

US 2010/0125608 A1    May 20, 2010

(30) Foreign Application Priority Data

Nov. 19, 2008    (KR) .................. 10-2008-0115024

(51) Int. Cl.
*G06F 17/30* (2006.01)
(52) U.S. Cl. ........................ 707/603; 707/791
(58) Field of Classification Search .......... 707/603, 707/791, 999.101; 702/150, 152
See application file for complete search history.

(56) References Cited

U.S. PATENT DOCUMENTS

| | | | | |
|---|---|---|---|---|
| 6,360,021 B1 * | 3/2002 | McCarthy et al. | ............ | 382/254 |
| 6,636,862 B2 * | 10/2003 | Lundahl et al. | ........................ | 1/1 |
| 6,931,403 B1 | 8/2005 | Agrawal et al. | | |
| 2006/0282443 A1 * | 12/2006 | Hanagata | ..................... | 707/100 |

OTHER PUBLICATIONS

Guo, Songtao et al., "Deriving Private Information from Arbitrarily Projected Data," *PAKDD 2007, LNAI 4426*, pp. 84-95 (2007).
Oliveira, Stanley R.M. et al., "Achieving Privacy Preservation When Sharing Data for Clustering," *Lecture Notes in Computer Science*, vol. 3178:67-82 (2004).

* cited by examiner

*Primary Examiner* — Apu Mofiz
*Assistant Examiner* — Monica Pyo
(74) *Attorney, Agent, or Firm* — Nelson Mullins Riley & Scarborough LLP; EuiHoon Lee, Esq.

(57) ABSTRACT

The present invention includes a rotation based transformation method for preserving data privacy. A rotation based transformation method according to an embodiment of the present invention divides a given data set into a plurality of data subsets, applies a plurality of different rotation matrixes to the plurality of divided data subsets, respectively, to rotate the plurality of data subsets, and re-concatenates the plurality of rotated data subsets to generate a rotated data set. The rotated data set is released and used for data clustering. The rotation based transformation method is effectively used when the impact of the AK-ICA attack is mitigated. Meanwhile, when the two parties are related to the present invention, the two parties need to agree on parameters, such as the number of data subsets. It is preferable that the data subsets be divided into equal sizes. Further, rotation-unification work that removes relative rotation deviation between the plurality of different rotation matrixes can be performed in order to provide valid clustering between the data subsets rotated using the different rotation matrixes.

10 Claims, 5 Drawing Sheets

ROTATION BASED TRANSFORMATION METHOD AND APPARATUS FOR PRESERVING DATA PRIVACY

RELATED APPLICATIONS

The present application claims priority to Korean Patent Application Serial Number 10-2008-115024, filed on Nov. 19, 2008, the entirety of which is hereby incorporated by reference.

BACKGROUND OF THE INVENTION

1. Field of the Invention

The present invention relates to a rotation based transformation method and apparatus that can perturb data using rotation for preserving data privacy, and more particularly, to a rotation based transformation method and apparatus that can mitigate the impact of the apriori knowledge independent component analysis (AK-ICA) attack on the rotation based transformation.

2. Description of the Related Art

A rotation based transformation (RBT) is effectively used for perturbing data used for data mining in order to maintain the individual data record's privacy. The advantage of the RBT is in its distance-invariant transformation. That is, the distance, inner product and angle between vectors of original numerical data is maintained even after the transformation is performed using the RBT. This is very important when, in data clustering based on a distance between data points, data transformed for the data clustering is used.

However, it has been discovered that the RBT may be vulnerable to the impact of the apriori knowledge independent component analysis (AK-ICA) attack. The independent component analysis (ICA) basically is a method for separating multivariate signals into additive components assuming the mutual statistical independence of non-Gaussian source signals. Moreover, the AK-ICA utilizes a portion of private data that an attacker knows to enhance the attack power. The power of the AK-ICA attack relies on several assumptions, but the most important thing is that a data sample given to the attacker has enough information in respect to the distribution of the entire data population, the data is of a specific type (according to the ICA conditions of work), and the attacker has enough information about the statistical properties of the data (for example, a minimum value and a maximum value).

SUMMARY OF THE INVENTION

Accordingly, it is an object of the present invention to mitigate the impact of the apriori knowledge independent component analysis (AK-ICA) attack (to reduce an influence by the AK-ICA) on an RBT used for privacy preserving data clustering.

It is another object of the present invention to mitigate the impact of the AK-ICA attack on rotation based perturbation by lowering applicability of the AK-ICA to rotated data.

In order to achieve the above-described objects, the present invention provides a multiple RBT (MRBT) that is a modification of an RBT according to the related art. The MRBT uses a plurality of different rotation matrixes that are obtained by using a plurality of different rotational angles constructed at the time of initializing the MRBT. In the MRBT, a data set is divided into a plurality of equal data subsets, and each data subset is rotated by applying a different rotation matrix to each data subset. As a result, rotated data that can mitigate the impact of the AK-ICA attack is obtained.

According to an embodiment of the present invention, a rotation based transformation method includes: dividing a given data set into a plurality of data subsets using a first computer system; applying a plurality of rotation matrixes to the plurality of divided data subsets, respectively, using the first computer system, to rotate the plurality of data subsets, in order to generate a plurality of rotated data subsets; concatenating the plurality of rotated data subsets using the first computer system in order to generate a rotated data set; and releasing the rotated data set using the first computer system, such that the rotated data set is used for data mining.

According to another embodiment of the present invention, a rotation based transformation apparatus includes: a rotation matrix generating unit that generates a plurality of different rotational angles from a plurality of different random values, respectively, using a one-way permutation, and generates a plurality of orthonormal rotation matrixes from the plurality of different rotational angles; a data dividing unit that divides a given data set into a plurality of equal data subsets; a rotation transforming unit that rotationally transforms each of the plurality of divided data subsets using the corresponding rotation matrix; a concatenating unit that concatenates the plurality of rotated data subsets in order to generate a rotated data set; and a data release unit that releases the rotated data set, such that the rotated data set is used for data mining.

The present invention provides a data mining method and apparatus that can perform data clustering by applying an arbitrary clustering algorithm to a released rotated data set according to the rotation based transformation method.

At this time, the data mining method and apparatus remove relative rotation deviation between the plurality of rotation matrixes before performing the clustering.

According to the present invention, as can be recognized from an experimental result, it is possible to mitigate the impact of the apriori knowledge independent component analysis (AK-ICA) attack (to reduce an influence by the AK-ICA) on an RBT used for privacy preserving data clustering. That is, according to the present invention, it is possible to mitigate the impact of the AK-ICA attack as compared with the RBT according to the related art.

According to the present invention, it is possible to mitigate the impact of the AK-ICA attack without increasing the processing load, as compared with the RBT according to the related art.

According to the present invention, since the MRBT maintains a distance-invariant characteristic in the same data subset like the RBT, a distance based clustering application that is applied to the RBT can be applied to the data subset of the MRBT. Further, if a rotation-unification process of the MRBT is used, it is possible to obtain the same clustering quality as the RBT according to the related art.

DESCRIPTION OF THE PREFERRED EMBODIMENTS

Hereinafter, a rotation based transformation method and apparatus according to an embodiment of the present invention will be described.

1. Rotation Based Transformation Method

A rotation based transformation method according to an embodiment of the present invention is an MRBT (multiple-rotation based transformation). The procedure of the MRBT algorithm basically includes three phases, that is, an initialization phase, a data rotation phase, and a data release phase (if necessary).

Figure 1:
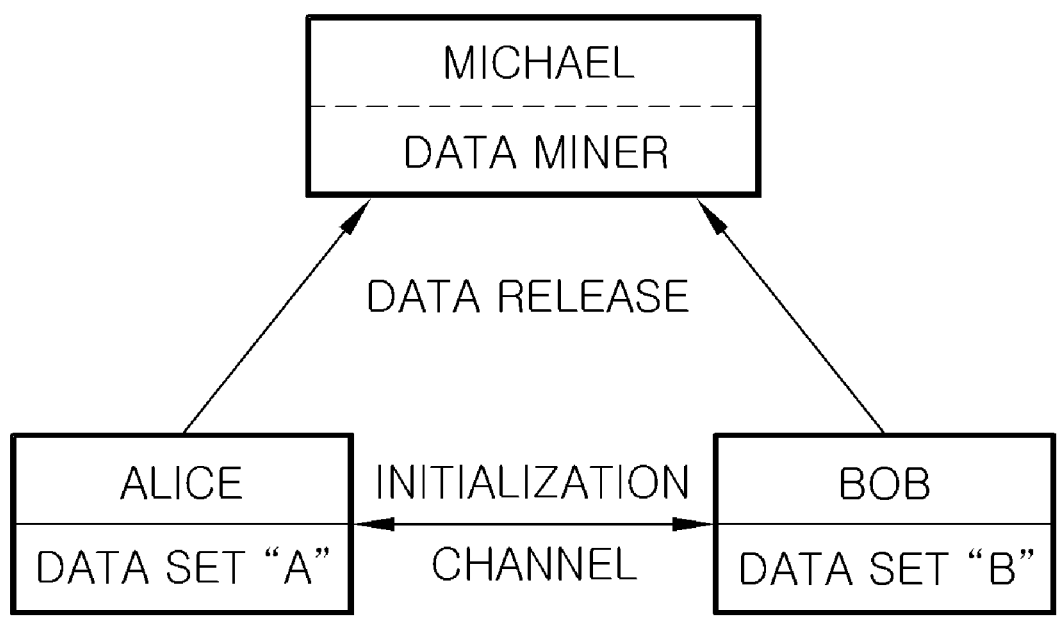
FIG. 1 is a conceptual diagram illustrating a rotation based transformation method according to an embodiment of the present invention.

As shown in FIG. 1, it is assumed that two parties, Alice and Bob, owning data sets A and B, respectively, and a third party, Michael, acting as a mining server exist. Each of the data sets A and B is composed of data having numerical values and has the same length and width (i.e., same number of attributes and records). The number of attributes and records in each data set is d and N (which are natural numbers), respectively. Accordingly, each data set as a data table can be represented in a matrix of d×N dimensions. Computer systems of Alice, Bob, and Michael are connected through a network and exchange information with each other through the network.

Figure 2:
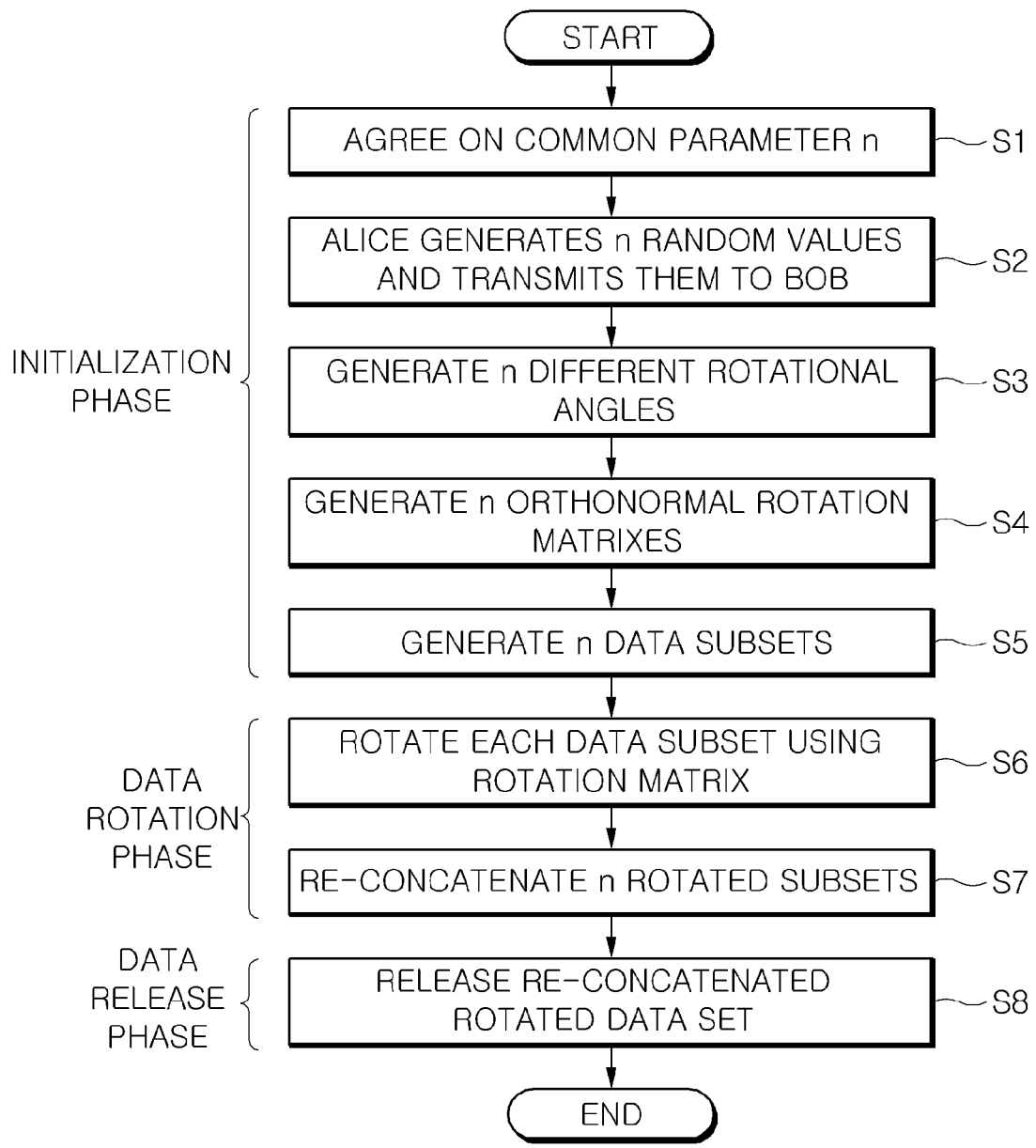
FIG. 2 is a flowchart illustrating a rotation based transformation method according to an embodiment of the present invention.

FIG. 2 is a flowchart illustrating a rotation based transformation method according to this embodiment.

(1) Initialization Phase

In this phase, the two parties (Alice and Bob) exchange a plurality of different random values with each other in order to use the random values as seeds to construct a plurality of rotation matrices. Also, the two parties agree on parameters. The procedure of the initialization is as follows.

Step S1: The two parties, Alice and Bob, agree on a common parameter n, such that N/n is an integer (that is, n is a divisor of N and a natural number). The common parameter n is differently determined depending on a countermeasure level required against the AK-ICA attack. That is, as described below, if n increases, the impact of the AK-ICA attack can be effectively mitigated, but n may be differently determined depending on a degree to which the AK-ICA attack is intercepted.

Step S2: The party, Alice, generates n different random values r1, r2, . . . , and rn and transmits them to the party, Bob. This step requires the two parties to have a basic secure communication method (i.e., pre-shared secret key) for the purpose of security. This step is a generalization of the conventional random nonce exchange.

Step S3: From the exchanged random values, the two parties generate different rotational angles θ1, θ2, . . . , and θn from the different random values r1, r2, . . . , and rn, using a one-way permutation. Values of θ1 to θn may be randomly generated or restricted as values in a specific range determined by the conventional method in the RBT according to the related art, for the purpose of perfect perturbation.

Step S4: Both parties construct orthonormal rotation matrices of $R_1, R_2, \ldots,$ and $R_n$, using the random values r1, r2, . . . , and rn transmitted as seeds (where Ri=f(θi)). An example of the rotation matrix Ri is as follows.

$$f(\theta_i) = R_i = \begin{pmatrix} \cos\theta_i & \sin\theta_i \\ -\sin\theta_i & \cos\theta_i \end{pmatrix}$$ [Equation 1]

Each matrix $R_i$ that is constructed above supports the multiplication by the corresponding parts of data subsets constructed in the following Step 5. That is, the rotation matrix Ri has the dimension of d×d.

Step S5 The party, Alice, divides her data set A into n equal data subsets (where A={A1, A2, . . . , An} and A1∪A2∪ . . . ∪An=A). The party, Bob, divides his data set B into n data subsets (where B={B1, B2, . . . , Bn} and B1∪B2∪ . . . ∪Bn=B). An operator U is defined as table mergence by vertically concatenating the data subsets represented as tables (where n is the parameter agreed in Step 1). This step can be simply expressed as means of matrix representation as follows.

$$A = \begin{pmatrix} A_1 \\ A_2 \\ \vdots \\ A_n \end{pmatrix} \text{ and } B = \begin{pmatrix} B_1 \\ B_2 \\ \vdots \\ B_n \end{pmatrix}$$ [Equation 2]

where Ai and Bi are sizes of d×c (c=N/n).

In Step S5, each data set is divided into equal parts, but may be divided into unequal parts. However, when each data set is divided into unequal parts, the two parties Alice and Bob need to agree on the different sizes. Further, when each data set is divided into unequal parts, an attacker who knows the different sizes first attacks a data subset having the largest size to reduce an attack error. Therefore, it may be vulnerable to security. However, if each data set is divided into equal parts, one data subset cannot have priority of an attack error with respect to another data subset. Therefore, since the equal attack error exists between the data subsets, it is advantageous in respect to security.

(2) Data Rotation Phase

In this phase, the two parties, Alice and Bob, rotate their individual data sets using the information obtained in the initialization phase. The procedure is as follows.

Sixth step S6: The party, Alice, rotates each data subset generated in Step S5 using the corresponding rotation matrices, which are constructed in Step S4. That is, the party, Alice, calculates $Y^1_A=R_1A_1, Y^2_A=R_2A_2, \ldots, Y^n_A=R_nA_n$, and the party, Bob, calculates $Y^1_B=R_1B_1, Y^2_B=R_2B_2, \ldots, Y^n_B=R_nB_n$.

Figure 3:
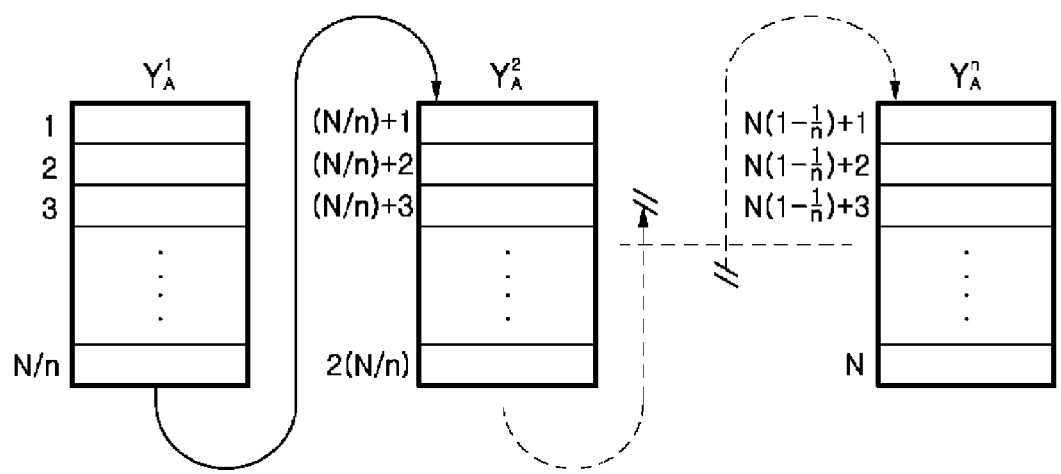
FIG. 3 is a diagram illustrating a re-concatenation of the data subsets in accordance with an embodiment of the present invention.

Step S7: The party, Alice, re-concatenates the rotated data subsets calculated in Step S6 to obtain $Y_A=Y^1_A \cup Y^2_A \cup \ldots \cup Y^n_A$ and the party, Bob, re-concatenate the rotated data subsets calculated in Step S6 to obtain $Y_B=Y^1_B \cup Y^2_B \cup \ldots \cup Y^n_B$. As shown in FIG. 3, the operator ∪ is defined as table mergence, as described above. FIG. 3 shows a process in which the wholly rotated data sets are constructed by the re-concatenation of the data subsets. Similar to Step S5, this process can be expressed as a matrix representation as follows.

$$Y_A = \begin{pmatrix} Y_A^1 \\ Y_A^2 \\ \vdots \\ Y_A^n \end{pmatrix} \text{ and } Y_B = \begin{pmatrix} Y_B^1 \\ Y_B^2 \\ \vdots \\ Y_B^n \end{pmatrix} \quad \text{[Equation 3]}$$

with the same size constraints on Ai and Bi.

(3) Data Release Phase

In this phase, the two parties Alice and Bob release their data sets to the public data miner in order to use the corresponding data for the mining purpose. This phase is simply performed as follows.

Step S8: The parties, Alice and Bob, release the rotated data obtained according to the above procedure to the third party, Michael, in order to use the data for data clustering.

2. Data Mining Method

Figure 4:
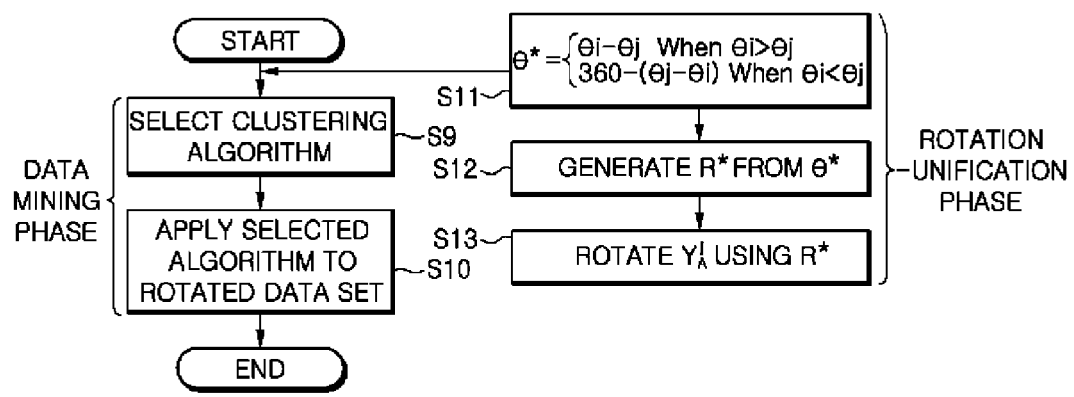
FIG. 4 is a flowchart illustrating a data mining method according to an embodiment of the present invention.

FIG. 4 is a flowchart illustrating a data mining method according to an embodiment of the present invention. In the data mining method according to this embodiment, in addition to the above-described phases, the following two phases are used for data mining. These two phases correspond to a data mining phase and an additive data release phase (rotation-unification phase).

(1) Data Mining Phase

Since the RBT and the MRBT preserve the distance between data vectors rotated using the same rotation matrix, any off-the-shelf clustering algorithm can be used to derive clusters in the data rotated using the MRBT. Therefore, the mining algorithm follows the following steps.

Step S9: Select any off-the-shelf clustering algorithm, for example, the k-nearest neighbor (kNN).

Step S10: Apply the selected algorithm to the rotated data sets in order to derive data clusters.

(2) Additional Data Release Phase

As a matter of fact, the MRBT does not support valid clustering between the data subsets for the same data owner. That is, the clustering results are only valid within the same data sets that are rotated using the same rotation matrix. In order to provide valid clustering between the data subsets that are rotated using different rotation matrices, the rotation-unification phase is performed. The following Steps are performed for the two data subsets Ai and Aj, and the data subsets Ai and Aj are rotated into $Y^i_A$ and $Y^j_A$ in order to provide valid clustering between their data points. Accordingly, the following Steps S11 to S13 are performed before the above Steps S9 and S10.

As such, in this phase, relative rotation deviation between a plurality of different rotation matrices is removed.

Step S11: The data owner generates θ* according to the values of θi and θj as follows.

$$\theta^* = \theta_i - \theta_j (\theta_i > \theta_j) \text{ or } \theta^* = 360 - (\theta_j - \theta_i)(\theta_i < \theta_j) \quad \text{[Equation 4]}$$

Step S12: The data owner generates a rotation matrix seeded by the previously generated θ* (i.e., R*) and releases the rotation matrix to the data miner.

Step S13: The data miner rotates the data subset $Y^j_A$ using the released matrix R* in order to unify it with the data $Y^i_A$ (note that all the rotations performed in this specification are counter-clockwise).

3. Rotation Based Transformation Apparatus

Figure 5:
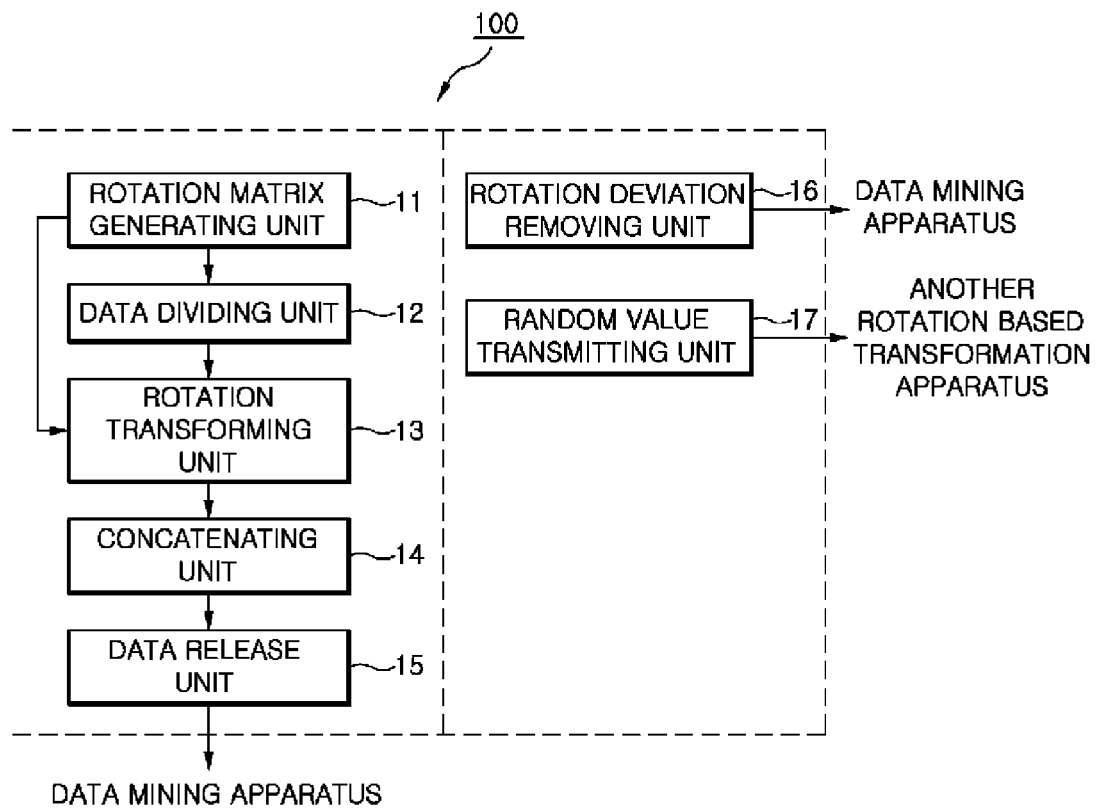
FIG. 5 is a functional block diagram illustrating a rotation based transformation apparatus according to an embodiment of the present invention.

FIG. 5 is a functional block diagram illustrating a rotation based transformation apparatus 100 according to this embodiment. The rotation based transformation apparatus according to this embodiment is a general computer system. The rotation based transformation apparatus includes a rotation matrix generating unit 11 that generates a plurality of rotation matrixes, a data dividing unit 12 that divides given data sets into a plurality of data subsets, a rotation transforming unit 13 that applies the plurality of rotation matrixes to the plurality of data subsets and performs rotation transformation, and a concatenating unit 14 that concatenates the plurality of data subsets that are rotationally transformed by the rotation transforming unit.

The rotation matrix generating unit 11 executes Steps S1 to S4 of FIG. 2 to generate the plurality of rotation matrixes. The data dividing unit 12 and the rotation transforming unit 13 execute Steps S5 and S6 of FIG. 2 to generate rotated data on each data subset. The concatenating unit 14 executes Step S7 of FIG. 2 and re-concatenates the rotated data subsets. As a result, the rotated data is obtained.

The rotation based transformation apparatus may further include a data release unit 15 that releases the rotationally transformed data sets by the concatenating unit to the outside. The released data may be used by a data mining apparatus, which will be described below.

Meanwhile, the rotation based transformation apparatus 100 may further include a rotation deviation removing unit 16 that removes relative rotation deviation between the plurality of rotation matrixes. The rotation deviation removing unit 16 executes Steps S11 and S12 of FIG. 4 and removes the relative rotation deviation. As shown in FIG. 1, when the two parties are related, the rotation based transformation apparatus 100 may further include a random value transmitting unit 17 that transmits a plurality of different random values to another rotation based transformation apparatus to be used when data sets are rotationally transformed by another rotation based transformation apparatus. The random value transmitting unit 17 executes Steps S1 and S2 of FIG. 2 and transmits the random values.

4. Data Mining Apparatus

Figure 6:
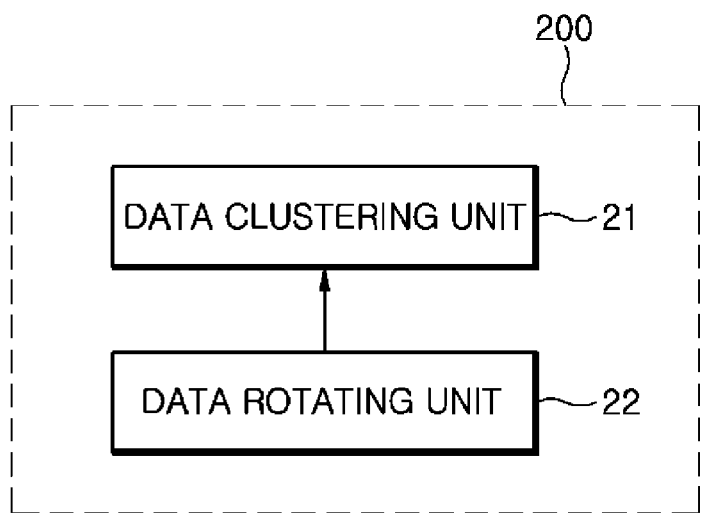
FIG. 6 is a functional block diagram illustrating a data mining apparatus according to an embodiment of the present invention.

FIG. 6 is a functional block diagram illustrating a data mining apparatus 200 according to an embodiment of the present invention. The data mining apparatus 200 according to this embodiment is a general computer system. The data mining apparatus 200 includes a data clustering unit 21 and a data rotating unit 22. The data clustering unit 21 executes Steps S9 and S10 shown in FIG. 3 and performs data mining. The data rotating unit 22 executes Steps S11 to S13 shown in FIG. 3 (Steps S11 and S12 are executed by the rotation based transformation apparatus) and unifies rotation between the data subsets of the same owner.

5. Application of an Embodiment to a Single User

The embodiment of the present invention relates to the plurality of parties, but may be applied to a single user. However, in the embodiment that is applied to the single user, the procedure where the two parties agree on the common parameter n and share data in the embodiment of the present invention is omitted. The other procedure is the same as that of the embodiment of the present invention.

That is, the party, Alice, arbitrarily selects the parameter n and divides her data set into n equal data subsets. Then, the party, Alice, generates θ1, θ2, . . . , and θn using n different seeds, and calculates orthonormal rotation matrixes of $R_1$, $R_2$, . . . , and $R_n$, (where Ri=f(θi)). The subsequent processes are the same as the processes after Step S5.

6. Experimental Result

In order to confirm that fact when the MRBT is superior to the RBT against the AK-ICA attack, the inventors perform the following experiments. The error measurement reference is a distance between original data and recovered data that are represented in a Frobenius norm. As represented in the following Equation 5, a Frobenius error is a relative error between X (original data) and X^ (estimation value of data recovered by the AK-ICA attack). When the relative error is small, this means that data is vulnerable to the AK-ICA attack, and when the relative error is large, this means that the impact of the AK-ICA attack is mitigated. The reason is as follows. The estimation value of the reconstructed data means the estimation value of the data that is recovered by the AK-ICA attack, and a large difference between the estimation value and the value of the original data means that the AK-ICA attack is not valid.

$$F\text{-}RE(X, \hat{X}) = \frac{\|\hat{X} - X\|_F}{\|X\|_F}; \|X\|_F = \sqrt{\sum_{i=1}^{d}\sum_{j=1}^{N} x_{i,j}^2}$$ [Equation 5]

where d is the number of attributes and N is the number of records.

The statistical attributes of the data sets that are used in the experiment where the AK-ICA attack is performed is shown in the following Table 1. Table 1 shows a mean, a minimum value (min), a maximum value (max), and a variation (var) of each of savings (Sa.), CDs (CD's), equations (Eq.), stocks (St.), and liabilities (Li.) The number N of records of the data sets that are used in the experiments is 50,000.

TABLE 1

|  | Sa. | CD's. | Eq. | St. | Li. |
|---|---|---|---|---|---|
| mean | 20.000 | 50.000 | 100.000 | 50.000 | 80.000 |
| min | −0.120 | 42.640 | 19.160 | 40.000 | 51.820 |
| max | 40.680 | 450.240 | 180.190 | 163.680 | 228.210 |
| var | 25.000 | 99.999 | 400.000 | 100.106 | 399.244 |

Further, the covariance of the data sets Σ is as follows.

$$\Sigma = \begin{pmatrix} 25.000 & 21.991 & 50.127 & 17.841 & 23.671 \\ 21.991 & 99.999 & 43.587 & 13.671 & 22.330 \\ 50.127 & 43.587 & 400.000 & 126.318 & 302.310 \\ 17.841 & 13.671 & 126.318 & 100.106 & 144.524 \\ 23.671 & 22.330 & 302.310 & 144.524 & 399.244 \end{pmatrix}$$ [Equation 6]

Meanwhile, since the data sets used in the experiments have a normal distribution and almost all data is concentrated in the data sets, a small sample for the original data also provides a large amount of information for the distribution of the entire population. Accordingly, even if only 10% of the entire data is selected, it is possible to sufficiently obtain information for the distribution of the entire population.

Figure 7:
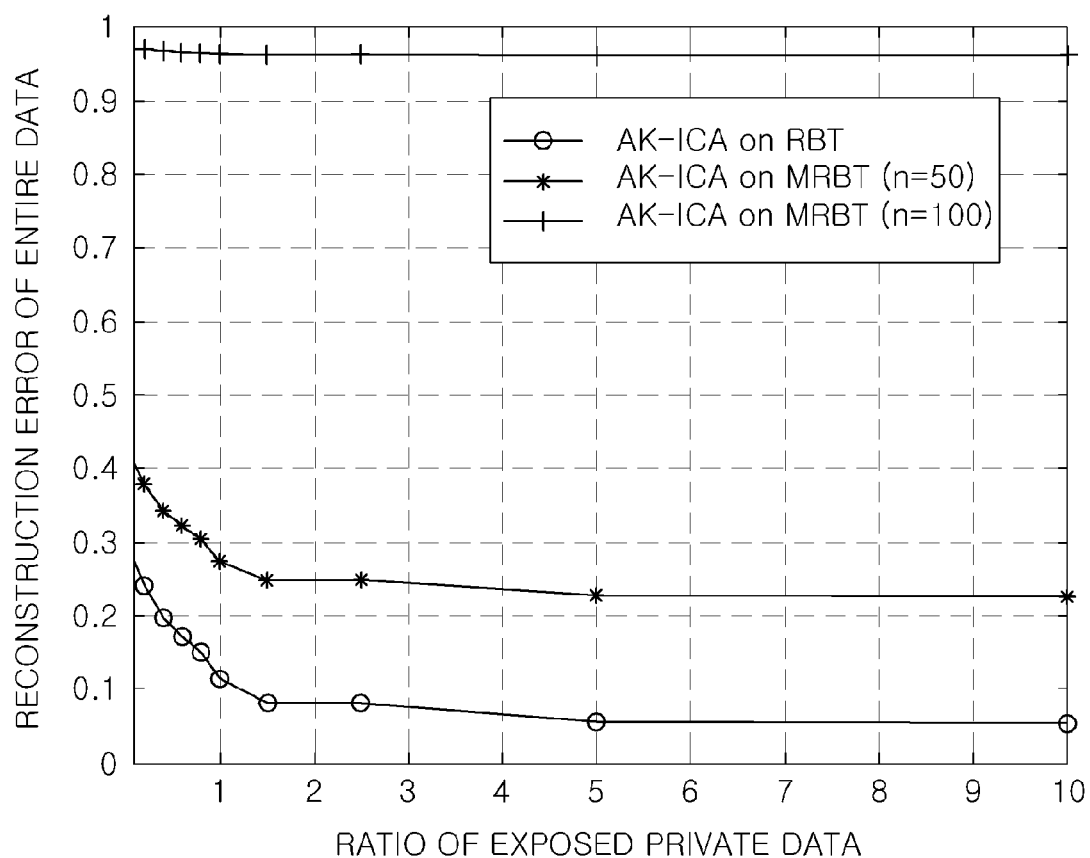
FIG. 7 is a graph illustrating an experimental result according to an embodiment of the present invention.

In FIG. 7, the experimental result is shown by a graph. The horizontal axis of the graph indicates a ratio (%) of private data exposed to the attacker and the vertical axis thereof indicates a reconstructed (recovered) error (Frobenius error) for the entire data. Referring to the corresponding drawing, the MRBT is superior to the RBT, regardless of the exposure ratio of the private data, and when the number n of the data subsets increases, the impact of the AK-ICA attack is mitigated. That is, in the case of n=100, an error rate is 95% or more. This means that data recovered by the AK-ICA attack is rarely matched with the original data in the case of n=100. In the case of n=50, as compared with the RBT, an error rate difference of three times or more is shown.

Meanwhile, when the data distribution is non-normal, the superiority of the MRBT to the RBT is much more prominent than the case of the data having the normal distribution.

Further, the multiplication between the data and the rotation matrix in the MRBT according to the embodiment of the present invention is n times larger than that in the RBT according to the related art, but a calculation overhead depends on the size of the entire data sets, not the number of rotation matrixes. Accordingly, the privacy preserving capability of the MRBT of the present invention is much more enhanced than that of the conventional RBT, while overheads of the MRBT and the RBT are equal to each other.

What is claimed is:

1. A rotation based transformation method, comprising:
dividing, using a first computer system, a given data set into a plurality of data subsets;
applying a plurality of rotation matrixes to the plurality of divided data subsets, respectively, using the first computer system, to rotate the plurality of data subsets, in order to generate a plurality of rotated data subsets;
concatenating the plurality of rotated data subsets using the first computer system in order to generate a rotated data set;
releasing the rotated data set using the first computer system, such that the rotated data set is used for data mining,
removing relative rotation deviation between the plurality of rotation matrixes, wherein, when data subsets Ai and Aj are rotated to $Y^iA$ and $Y^jA$ by rotational angles θi and θj corresponding to the data subsets and released, the removing of the relative rotation deviation includes generating θ* using the following Equation (θ*=θi−θj (θi>θj) or θ*=360−(θj−θi) (θi<θj)), generating a rotation matrix R* using θ*, and releasing the rotation matrix R* ; and
rotating the data subset $Y^jA$ using the released matrix R* in order to unify it with the data $Y_A^i$.

2. The rotation based transformation method of claim 1, further comprising:
generating a plurality of corresponding different rotational angles from a plurality of different random values, respectively, using the first computer system,
wherein the plurality of rotation matrixes are generated orthonormally from the different rotational angles.

3. The rotation based transformation method of claim 2, wherein the plurality of different rotational angles are generated using a one-way permutation.

4. The rotation based transformation method of claim 2, wherein, when the data set is represented as a matrix having the dimension of d×N as a data table including d attributes and N records, each rotation matrix has the dimension of d×d, and the number of each of the plurality of random values and the plurality of data subsets is n, each data subset is represented as a matrix having the dimension of d×(N/n) as a data table including d attributes and N/n records, wherein N/n is an integer, wherein each of d, N, and n is a natural number, and
in the rotating of the plurality of data subsets, n rotated data subsets each of which is represented as a matrix having the dimension of d×(N/n) by multiplying each rotation matrix by a matrix of each data subset are generated, and
in the concatenating of the plurality of rotated data subsets, the rotated data set including d attributes and N records is generated by concatenating the n rotated data subsets using a table mergence.

5. The rotation based transformation method of claim 1, wherein, in the dividing of the data set, the data set is divided into a plurality of equal data subsets.

6. The rotation based transformation method of claim 1, further comprising:

transmitting a plurality of different random values to a second computer system different from the first computer system so as to be used at the time of the rotation transformation of a data set in the second computer system.

7. A data mining method that performs data clustering by applying an arbitrary clustering algorithm to a rotated data set released in accordance with a rotation based transformation method, the rotation based transformation method comprising:

dividing, using a first computer system, a given data set into a plurality of data subsets;

applying a plurality of rotation matrixes to the plurality of divided data subsets, respectively, using the first computer system, to rotate the plurality of data subsets, in order to generate a plurality of rotated data subsets;

concatenating the plurality of rotated data subsets using the first computer system in order to generate a rotated data set; and releasing the rotated data set using the first computer system, such that the rotated data set is used for data mining, wherein, when relative rotation deviation between the plurality of rotation matrixes is removed by the first computer system, and data subsets Ai and Aj are rotated to $Y^i_A$ and $Y^j_A$ by rotational angles $\theta_i$, and $\theta_j$ corresponding to the data subsets and released, the removing of the relative rotation deviation includes generating $\theta^*$ using the following Equation ($\theta^*=\theta i-\theta j$ ($\theta i>\theta j$) or $\theta^*=360-(\theta j-\theta i)(\theta i<\theta j)$), Generating a rotation matrix $R^*$ using $\theta^*$, and releasing the rotation matrix $R^*$, and the data mining method further includes rotating $Y^j_A$, using the released matrix $R^*$.

8. A rotation based transformation apparatus, comprising:

a memory;

a rotation matrix generating unit that generates a plurality of different rotational angles from a plurality of different random values, respectively, using a one-way permutation, and generates a plurality of orthonormal rotation matrixes from the plurality of different rotational angles;

a data dividing unit that divides a given data set into a plurality of equal data subsets;

a rotation transforming unit that rotationally transforms the plurality of divided data subsets using the corresponding rotation matrixes;

a concatenating unit that concatenates the plurality of rotated data subsets in order to generate a rotated data set; and a data release unit that releases the rotated data set, such that the rotated data set is used for data mining, a rotation deviation removing unit that removes relative rotation deviation between the plurality of rotation matrixes, wherein, when data subsets Ai and Aj are rotated to $Y^i_A$ and $Y^j_A$ by rotational angles $\theta_i$, and $\theta_j$ corresponding to the data subsets and released, the rotation deviation removing unit generates $\theta^*$ using the following Equation($\theta^*=\theta i-\theta j$ ($\theta i>\theta j$) or $\theta^*=360-(\theta j-\theta i)$ ($\theta i<\theta j$)), generating a rotation matrix $R^*$ using $\theta^*$, and releasing the rotation matrix $R^*$.

9. The rotation based transformation apparatus of claim 8, wherein, when the data set is represented as a matrix having the dimension of d×N as a data table including d attributes and N records, each rotation matrix has the dimension of d×d, and the number of each of the plurality of random values and the plurality of data subsets is n, each data subset is represented as a matrix having the dimension of d×(N/n) as a data table including d attributes and N/n records, wherein N/n is an integer, wherein each of d, N, and n is a natural number, and the rotation transforming unit generates n rotated data subsets each of which is represented as a matrix having the dimension of d×(N/n) by multiplying each rotation matrix by a matrix of each data subset, and the concatenating unit generates the rotated data set including d attributes and N records by concatenating the n rotated data subsets using a table mergence.

10. The rotation based transformation apparatus of claim 8, further comprising:

a random value transmitting unit that transmits the plurality of different random values to another rotation based transformation apparatus so as to be used at the time of the rotation transformation of a data set in another rotation based transformation apparatus.

* * * * *